Figure 1:
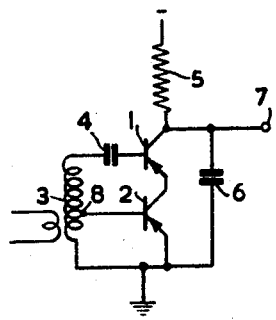

Dec. 1, 1959   J. M. CLUWEN   2,915,636
FREQUENCY DETECTOR
Filed Dec. 31, 1956

INVENTOR
JOHANNES MEIJER CLUWEN

BY
AGENT

United States Patent Office 2,915,636
Patented Dec. 1, 1959

2,915,636

FREQUENCY DETECTOR

Johannes Meyer Cluwen, Eindhoven, Netherlands, assignor, by mesne assignments, to North American Philips Company, Inc., New York, N.Y., a corporation of Delaware Application December 31, 1956, Serial No. 631,777

Claims priority, application Netherlands January 28, 1956

8 Claims. (Cl. 250—31)

The invention relates to a transistor frequency-detector. It has for its object to provide a detector which is simple and which produces a detected signal which is substantially independent of any amplitude modulation of the frequency-modulated oscillations to be detected.

The invention has the feature that the oscillations to be detected are fed to a parallel resonant circuit consisting of the closed series circuit of an inductor, a capacitor and the base-emitter path of a transistor, whilst the circuit voltage is applied between the base and the emitter of a second transistor, so that, at the resonance frequency of the circuit, the control currents of the two transistors exhibit a phase shift of substantially 90° and the detected current is produced across a common output circuit of the two transistors.

The invention will be described with reference to the drawing, in which

Figure 2:
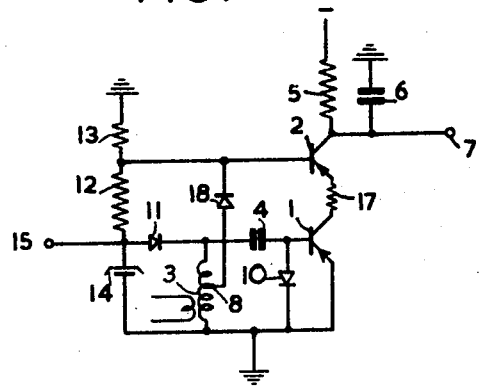

Fig. 1 shows a principal diagram,

Fig. 2 further details of one embodiment and

Figure 3:
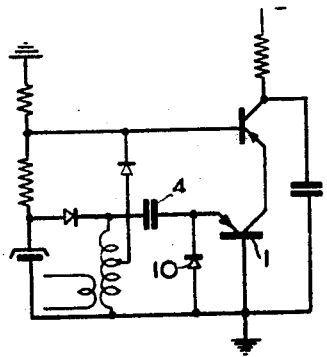

Fig. 3 a variation of the embodiment shown in Fig. 2.

Referring to Fig. 1, frequency-modulated oscillations to be detected are fed in well known manner, for example, by means of a coupling winding, to a resonant circuit consisting of an inductor 3 and a capacitor 4. The resonant circuit is connected in series between the base and the emitter of a first junction transistor 1. A second transistor 2 is arranged with its base connected to a tapping 8 of the inductor 3. The circuit voltage at this tapping 8 therefore has a phase shift of 90° relative to the current across the circuit 3—4 with an adequate input resistance of the transistor 2 and at the resonance frequency of the circuit 3—4. Thus also the base current of the transistor 2 has, with this frequency, a phase shift of 90° relative to the base current of the transistor 1, whilst with the frequency sweep, a frequency-dependent phase shift is produced between the two currents.

The series combination of the transistors 1 and 2 becomes conductive only during the negative half period of the voltages at their base electrodes. There, it passes a current determined by the said phase shift to the detector output filter 5—6, through which, accordingly, a voltage approximately proportional to the said frequency sweep is produced and fed to an output terminal 7. By using the single circuit 3—4, the risk of sideband detection with the conventional frequency detectors is materially reduced. This principle diagram includes a few disadvantages, which are reduced in the embodiment shown in Fig. 2.

In the first place the collector-emitter path of the transistor 2, connected in series with the circuit 3—4, produces a damping of this circuit, whilst furthermore the operational voltages are less favourable than in the case in which the base of the transistor 1 is connected to the tapping 8 and that of the transistor 2 to the capacitor 4, in other words, if the emitter-collector paths of the transistors 1 and 2 had been exchanged (Fig. 2).

In the second place the base-emitter path of the transistor 1 provides a rectification; this may be obviated by connecting an adequately low value of resistance in parallel between the emitter and the base. Moreover, one half period of the oscillation to be detected experiences a damping differing from that of the other half period; to this end, instead of this resistor, rather a rectifier 10 with a pass direction opposite that of the emitter-base path concerned is provided.

In the third place it is usually desirable for the detector to be insensitive to any amplitude modulation of the oscillations to be detected. To this end the resonant circuit 3—4 of Fig. 2 is connected to a dynamic limiter, consisting of a rectifier 11, the resistors 12 and 13 and a capacitor 14, the latter decoupling the resistors 12 and 13 even for the lowest modulation frequency. Since the voltage across the capacitor 14 remains therefore substantially constant and equal to the mean oscillation amplitude, any amplitude modulation of the oscillations will produce a variable damping of the circuit 3—4, which damping suppresses this amplitude modulation. The voltage across the capacitor 14 may furthermore serve for automatic additional gain control (terminal 15). It is furthermore possible to obtain a further suppression of the sensitivity to unwanted amplitude modulation, since the amplitude of the current passing in series through the transistors 1 and 2 and through the output filter 5—6 is limited to a value corresponding to the voltage across the capacitor 14. To this end, if necessary after further smoothing this voltage is fed to the base of the transistor 2, whilst between the collector of the transistor 1 and the emitter of the transistor 2 there is connected a resistor 17. The said current amplitude then can not exceed the voltage at the base of the transistor 2 divided by the value of resistor 17, since otherwise the transistors 1 and 2 would become non-conductive.

For a practical embodiment of this idea the voltage across the capacitor 14 is fed via the resistor 12 and that at the tapping 8 via a rectifier 18 to the base of the transistor 2. During the positive half period of the circuit voltage at the tapping 8 the rectifier 18 is thus kept conductive, the transistor 2 being thus cut off. During the negative half period of this circuit voltage, the voltage at the base of the transistor 2 cannot become more negative than the voltage produced by the capacitor 14 across the resistor 13, since the rectifier 18 becomes non-conductive. The amplitude of the voltage at the tapping 8 is then a few times the direct voltage across the resistor 13.

Thus the base of the transistor 2 is periodically polarized in the forward direction with a substantially constant voltage produced across the resistor 13. Since the base of the transistor 1 is polarized in the forward direction during periodical phase-shifted time intervals, current flows to the output filter 5—6 only during a time interval determined by this phase shift, i.e. by the frequency sweep of the oscillations to be detected. The amplitude of this current is substantially constant, so that the low-frequency voltage produced at the output terminal 7 is substantially independent of amplitude modulation and is approximately proportional to the frequency modulation of the oscillations to be detected.

The transistor 1 of Fig. 2 may be operated, if desired, in grounded base connection in order to reduce its input resistance (see Fig. 3); in this case its emitter is connected to the capacitor 4. The forward direction of the rectifier 10 must then, of course, be reversed.

What is claimed is:

1. A frequency detector circuit comprising a first transistor having base, emitter and collector electrodes, an inductor and a capacitor connected in series between said base and emitter electrodes thereby forming a closed series circuit of which said inductor and capacitor form a parallel resonant circuit, a source of frequency-modulated oscillations coupled to said resonant circuit, a second transistor having base, emitter and collector electrodes, means connecting the base of said second transistor to a point of said resonant circuit supplying to said base a signal current substantially 90 degrees out of phase with the signal current supplied to the said first transistor at the resonance frequency of said parallel resonance circuit, and a common output circuit connected to the collector current paths of said first and second transistors.

2. A frequency detector circuit as claimed in claim 1, including means connecting the emitter electrode of said second transistor to the collector electrode of said first transistor, and means connecting the base electrode of said second transistor to a point on said inductor.

3. A frequency detector circuit as claimed in claim 1, including a rectifier connected between the base and emitter electrodes of said first transistor and poled in opposition to the conductivity direction of said last-mentioned electrodes.

4. A frequency detector circuit as claimed in claim 1, including means connecting the emitter-collector paths of said first and second transistors in series with said common output circuit.

5. A frequency detector circuit as claimed in claim 1, including means connecting the emitter-collector path of said second transistor and the collector-base path of said first transistor in series with said common output circuit.

6. A frequency detector circuit as claimed in claim 1, including a dynamic limiter circuit connected across said parallel resonant circuit.

7. A frequency detector circuit as claimed in claim 6, including means connecting the emitter-collector paths of said first and second transistors in series with said common output circuit, and control means connected to limit the current in said emitter-collector paths in accordance with the output of said dynamic limiter circuit.

8. A frequency detector circuit as claimed in claim 7, in which said dynamic limiter comprises a rectifier and a capacitor connected in series across said parallel resonant circuit, and in which said control means comprises a resistor connected between the last-named capacitor and the base electrode of said second transistor, and including a rectifier connected between the base of said second transistor and a point on said inductor, and a resistor connected between the collector electrode of said first transistor and the emitter electrode of said second transistor.

References Cited in the file of this patent

FOREIGN PATENTS 1,121,328     France _____ Apr. 30, 1956